United States Patent [19]
Van De Witte

[11] Patent Number: 5,936,692
[45] Date of Patent: Aug. 10, 1999

[54] MULTI-DOMAIN LIQUID-CRYSTAL DISPLAY DEVICE

[75] Inventor: Peter Van De Witte, Eindhoven, Netherlands

[73] Assignee: U.S. Philips Corporation, New York, N.Y.

[21] Appl. No.: 09/090,004

[22] Filed: Jun. 2, 1998

[30] Foreign Application Priority Data

Jun. 11, 1997 [EP] European Pat. Off. .............. 97201770

[51] Int. Cl.$^6$ ................................................. G02F 1/1337
[52] U.S. Cl. ........................... 349/128; 349/88; 349/179; 349/187
[58] Field of Search .................................. 349/88, 93, 94, 349/128, 129, 134, 175, 179, 183, 187, 191; 252/299.01; 430/20

[56] References Cited

U.S. PATENT DOCUMENTS

| | | | |
|---|---|---|---|
| 5,204,763 | 4/1993 | Hokmet . | |
| 5,262,882 | 11/1993 | Hokmet . | |
| 5,623,354 | 4/1997 | Lien et al. ................................ | 349/124 |
| 5,757,455 | 5/1998 | Sugiyama et al. ...................... | 349/129 |
| 5,831,700 | 11/1998 | Li et al. ................................... | 349/88 |

FOREIGN PATENT DOCUMENTS

WO 9518989 7/1995 WIPO .

*Primary Examiner*—Hung Xuan Dang
*Assistant Examiner*—Tai V. Duong
*Attorney, Agent, or Firm*—David R. Treacy

[57] ABSTRACT

The invention relates to a multi-domain liquid-crystal display device comprising two substantially parallel substrates which are provided with an electrode layer and an orientation layer. A layer of a nematically ordered liquid-crystalline material comprising a chiral dopant is sandwiched between the substrates. The layer is structured in such a manner that the pixels of the layer are composed of at least two types of sub-pixels in which the twist senses of the liquid-crystalline material are mutually opposite. This construction in accordance with the invention is achieved by differentiating the composition of the chiral dopant in the different types of sub-pixels. This is attained by employing isomerizable chiral dopants and/or diffusion techniques in combination with local exposure of the liquid-crystal layer. The invention also provides methods of manufacturing such multi-domain liquid-crystal display devices. The multi-domain liquid-crystal display devices in accordance with the invention are easier to manufacture than display devices in which the orientation layers must be structured.

10 Claims, 2 Drawing Sheets

A:

B:

C:

D:

MULTI-DOMAIN LIQUID-CRYSTAL DISPLAY DEVICE

BACKGROUND OF THE INVENTION

The invention relates to a multi-domain liquid-crystal display device comprising two substantially parallel substrates which are provided with an electrode layer and an orientation layer, a layer of a nematically ordered liquid-crystalline material containing a chiral dopant being sandwiched between said substrates, and said layer being structured such that the pixels of the layer are composed of at least two types of sub-pixels in which the twist senses of the liquid-crystalline material are mutually opposite. The invention also relates to methods of manufacturing such a display device. Display devices of this type can be employed, for example, in monitors and TV receivers as well as in measuring equipment.

Display devices of the above-mentioned type are known per se, for example, from the international patent application with publication no. WO 95/18989. In such display devices, the individually drivable pixels are composed of two sub-pixels having an opposite twist sense. In the one type of sub-pixel, the liquid-crystalline material has an anticlockwise twist sense, while in the other type of sub-pixel the liquid-crystalline material has a clockwise twist sense. If desirable, each of the sub-pixels may itself be composed of two further sub-pixels by providing two regions in which the liquid-crystalline molecules have a different tilt direction. In this case, four different types of sub-pixels can be distinguished in the display device.

An important advantage is achieved by subdividing the pixels into two or even four types of mutually different sub-pixels. It has been found that this causes the viewing angle dependence of the device to be substantially improved. The viewing angle dependence of a display device is to be taken to mean the degree of contrast, grey-scale inversion, discoloration and brightness variation of the device as a function of the angle from which the device is viewed. In general, the aim is to minimize the viewing angle dependence. This means that the intended display device should demonstrate, as a function of the viewing angle, a high contrast, a proper grey-scale distance, little discoloration as well as a small brightness variation.

The known display device has an important drawback which manifests itself, in particular, when the display device is mass-produced. For example, in the manufacture of the known devices, a number of rubbing steps and/or lithographic steps are necessary to provide the orientation layer with the desired structure at the level of the sub-pixels. Such steps are very unattractive from the production-technical point of view.

SUMMARY OF THE INVENTION

It is an object of the invention to obviate said disadvantage. The invention more particularly aims at providing a liquid-crystal display device which is relatively easy to manufacture. An additional object of the invention is to provide methods of manufacturing such display devices.

These and other objects of the invention are achieved by a multi-domain liquid-crystal display device comprising two substantially parallel substrates which are provided with an electrode layer and an orientation layer, a layer of a nematically ordered liquid-crystalline material containing a chiral dopant being sandwiched between said substrates, and said layer being structured such that the pixels of the layer are composed of at least two types of sub-pixels in which the twist senses of the liquid-crystalline material are mutually opposite, characterized in that the composition of the chiral dopant in the different types of sub-pixels is different.

The invention is based on the experimentally gained insight that the twist sense of the liquid-crystalline material of the nematically ordered layer can be locally set by locally differing the composition of the chiral dopant. This is to be understood to mean that the chiral compounds of the dopant comprised in the different types of sub-pixels are different in concentration, chemical structure and/or spatial structure. It has been found that, at the level of the sub-pixels, it is possible to locally set the twist sense.

The complicated and time-consuming structuring of the orientation layers by means of one or more rubbing steps, whether or not in combination with lithographical processes, is rendered superfluous, in principle, by applying the present invention. It is stressed, however, that the picture quality of the display device can be improved, if necessary, by applying such structured orientation layers. It is further noted that the known display devices sometimes comprise a small quantity of a chiral dopant. In said known devices, this chiral dopant is uniformly distributed in the nematically ordered liquid-crystalline material. Such a chiral dopant serves to provide the liquid-crystalline material with a uniform twist sense.

A preferred embodiment of the device in accordance with the invention is characterized in that the liquid-crystalline material comprises a polymer. The presence of such a polymer, for example in the form of a linear polymer, causes the diffusion of the chiral dopant from sub-pixels to adjacent sub-pixels to be reduced. Such a diffusion may disturb or otherwise adversely affect the opposite twist sense of the adjacent sub-pixels.

Preferably, the liquid-crystalline material comprises a polymeric network. A polymeric network is to be taken to mean a polymeric structure extending in three dimensions. Just like linear polymers, a polymeric network causes the diffusion of the chiral dopant in the liquid-crystalline layer to be reduced. However, the polymeric network has a particular advantage relative to a linear polymer. It has been found that a polymeric network also stabilizes the originally present structure of the sub-pixels, even if adjacent sub-pixels comprise a part of the dopant as a result of diffusion. As a result, the use of a polymeric network in the nematically ordered liquid-crystalline material causes the durability of the device to be further increased.

It is noted that both the linear polymers and the polymeric network may comprise, if desirable, liquid-crystalline groups which are linked to the network via a covalent bond.

A further preferred embodiment of the device in accordance with the invention is characterized in that a part of the molecules of the chiral dopant are linked to the network via a chemical bond. By virtue of this measure, the diffusion problem of the chiral dopant is further reduced. This also leads to a further increase in durability of the device in accordance with the invention.

Another preferred embodiment of the display device in accordance with the invention is characterized in that the orientation layer of the one substrate has pretilt-inducing properties and the orientation layer of the other substrate does not have pretilt-inducing properties. During the manufacture of the device, the liquid-crystalline material will demonstrate a greater tendency to orient itself on the layer with the pretilt than on the orientation layer without a pretilt. During the reversal of the twist sense of the sub-pixels, reorientation of the liquid-crystalline molecules on the orientation layer without a pretilt will be possible.

The invention also relates to methods of manufacturing a multi-domain liquid-crystal display device. In accordance with the invention, a first method comprises the following steps:

applying a layer of a liquid-crystalline material between two substantially parallel substrates which are provided with an electrode layer and an orientation layer, said liquid-crystalline material including an isomerizable chiral dopant with a first twist sense, as well as a non-isomerizable chiral dopant with an opposite twist sense, positioning a mask relative to the layer, locally exposing the layer of liquid-crystalline material by means of the mask, thus causing the isomerizable chiral dopant to be converted.

This method enables a multi-domain liquid-crystal display device to be obtained in an elegant and relatively simple manner. The expression "isomerizable chiral dopant" is to be taken to mean (mixtures of) chiral dopants which are converted, under the influence of radiation, from one chiral form (for example laevorotatory) to the other chiral form (dextrorotatory), or conversely. The conversion of the isomerizable chiral dopant causes the net concentration of laevorotatory and dextrorotatory components in the exposed sub-pixels to be changed. As a result, the net twist sense in the unexposed sub-pixels will become opposite to that in the exposed sub-pixels, provided that the concentrations of both chiral dopants and the exposure conditions are properly selected.

A favorable embodiment of the method in accordance with the invention is characterized in that the liquid-crystalline material comprises reactive monomers which are polymerized into a polymer. This measure leads to an improved service life of the display device in accordance with the invention.

It is noted that the class of new compounds of the isomerizable chiral (meth)acrylate-type can be very advantageously used in said method.

Another interesting embodiment of the method in accordance with the invention is characterized in that the reactive monomers are thermally polymerized to form the polymeric network. In practice, it has been found that thermal polymerization of the network can be achieved more readily than photo-polymerization. This can be attributed to the fact that in the case of thermal polymerization, polymerization and isomerization take place via different, non-interfering processes.

Another method of manufacturing a multi-domain liquid-crystal display device comprises, in accordance with the invention, the following steps:

applying a layer of a liquid-crystalline material between two substantially parallel substrates which are provided with an electrode layer and an orientation layer, said material comprising a reactive chiral dopant demonstrating a first twist sense as well as a non-reactive chiral dopant demonstrating an opposite twist sense, positioning a mask relative to the layer, locally exposing the liquid-crystalline material by means of said mask, thereby causing the reactive chiral dopant to be polymerized.

This method enables a multi-domain liquid-crystal display device to be obtained in an elegant and relatively simple manner. During the polymerization process, diffusion of the reactive dopant from the unexposed sub-pixels to the exposed sub-pixels occurs, and this dopant is converted into a polymeric network at the location of the exposed sub-pixels. As a result, the concentration of this dopant in the exposed parts becomes much higher than in the unexposed parts. Consequently, if the concentrations of both chiral dopants are properly selected, the net twist sense in the unexposed sub-pixels will be contrary to that in the exposed sub-pixels.

An interesting embodiment of the last-mentioned method is characterized in that the liquid-crystalline material also comprises reactive, achiral monomers. These monomers are polymerized upon local exposure of the layer. A proper choice of the quantities of reactive chiral and reactive achiral monomers, along with properly selected polymerization conditions, enable an optimum setting of the switching properties and optical properties of the nematically ordered liquid-crystalline layer.

These and other aspects of the invention will be apparent from and elucidated with reference to the embodiments described hereinafter.

BRIEF DESCRIPTION OF THE DRAWINGS

In the drawings:

It is noted that, for clarity, FIG. 1 is not drawn to scale.

DESCRIPTION OF THE PREFERRED EMBODIMENTS

Figure 1:
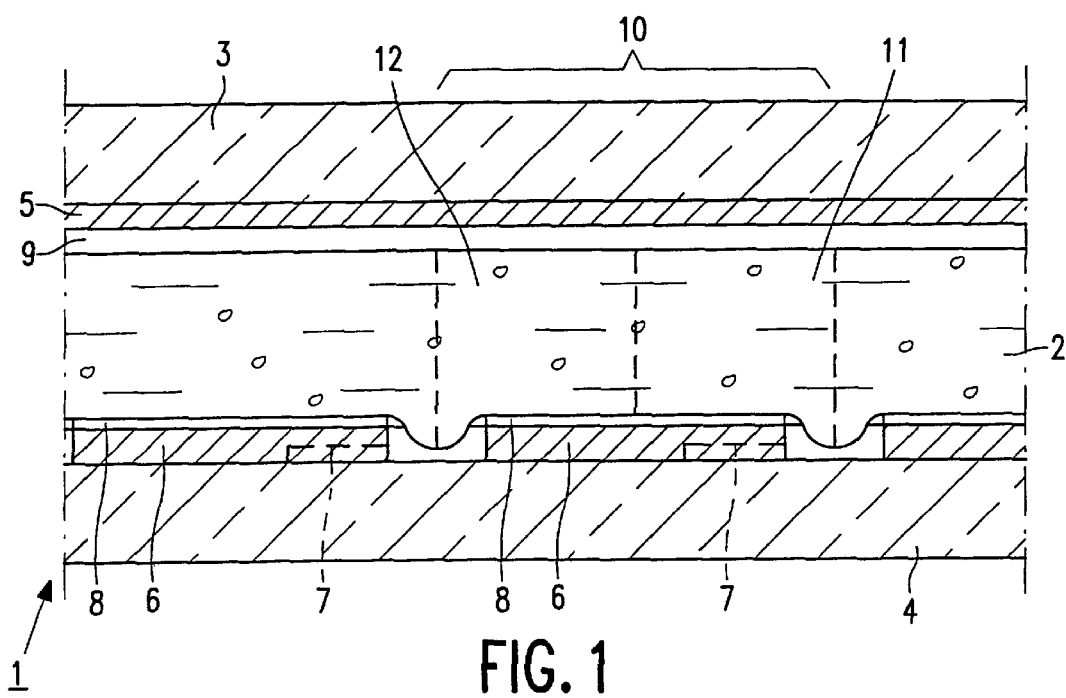
FIG. 1 is a schematic, cross-sectional view of a multi-domain liquid-crystal display device in accordance with the invention.

FIG. 1 is a schematic, cross-sectional view of a part of a multi-domain liquid-crystal display device in accordance with the invention. This display device comprises a liquid-crystal cell (1) which is provided with a nematically ordered liquid-crystal material (2) which is sandwiched between two substantially parallel substrates (3, 4). The liquid-crystalline material comprises a chiral dopant. At least one of the two substrates is made of a transparent material, for example glass. The substrates are provided with electrodes (5, 6) in the form of rows and columns, which together form an electrode matrix. At least one of the two electrodes consists of a transparent material, for example on the basis of ITO (indium tin oxide). This material is present on the transparent substrate.

The display device comprising said cell (1) may be of the passive type. Preferably, the device is of the active type; for this purpose, the cell is provided with (schematically indicated) active switching elements (7), which connect the electrodes (6) with drive electrodes (not shown). For clarity, the further drive electronics of the display device is not shown. If necessary, the device further comprises two polarizers (not shown) whose directions of polarization cross each other at right angles.

The cell further comprises two orientation layers (8, 9), which are preferably made of polyimide and which are applied to the facing surfaces of the electrode layers. Said orientation layers may be uniformly oriented, for example, by subjecting them to a rubbing treatment. If necessary, one or both orientation layers may alternatively be structured in known manner. A specific preferred direction, parallel to the direction of rubbing, is imposed, at the location of the orientation layer, on the liquid-crystalline molecules of the liquid-crystalline material (2) which is situated between the two substrates. Dependent upon the type of material and the thickness of the liquid-crystalline layer, a nematically ordered liquid-crystalline layer can be obtained in this manner.

The rows and columns of the electrode matrix define a matrix of pixels having dimensions of approximately 100 by 300 micrometers. Each of these pixels can be individually driven by means of the rows and columns. In accordance with the invention, the pixels are composed of two or four sub-pixels, or another multiple of two. In the display device shown, the pixels (10) are subdivided into two sub-pixels (11, 12). The twist sense of the nematically ordered material in sub-pixel (11) is opposite to that in sub-pixel (12).

In accordance with the invention, the composition of the chiral dopant in the sub-pixel (11) differs from that in the sub-pixel (12). This difference can be achieved in various ways. For example, use can be made of isomerizable chiral compounds, which are treated in such a manner that the sums of the chirality in the two different types of sub-pixels have adopted an opposite sign. Alternatively, diffusion mechanisms can be used to adapt the concentration of chiral compounds in the two different types of sub-pixels in such a manner that the twist sense in the one sub-pixel is opposite to that in the other sub-pixel.

Figure 2:
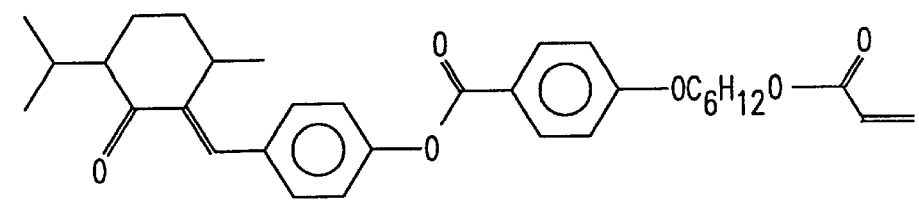
FIG. 2 shows a number of compounds used in the manufacture of the display device in accordance with the invention.
Figure 2:
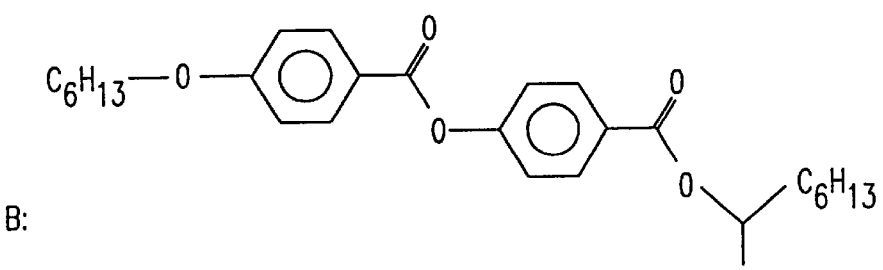
Figure 2:
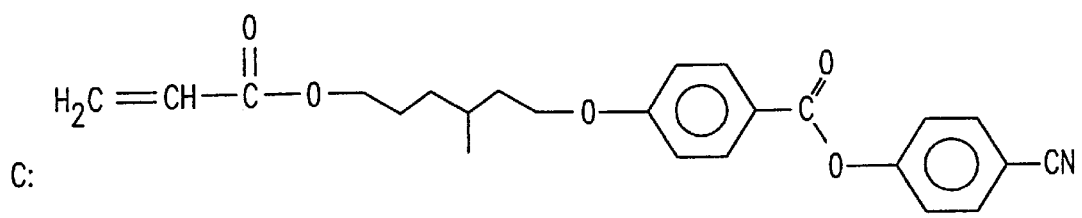
Figure 2:
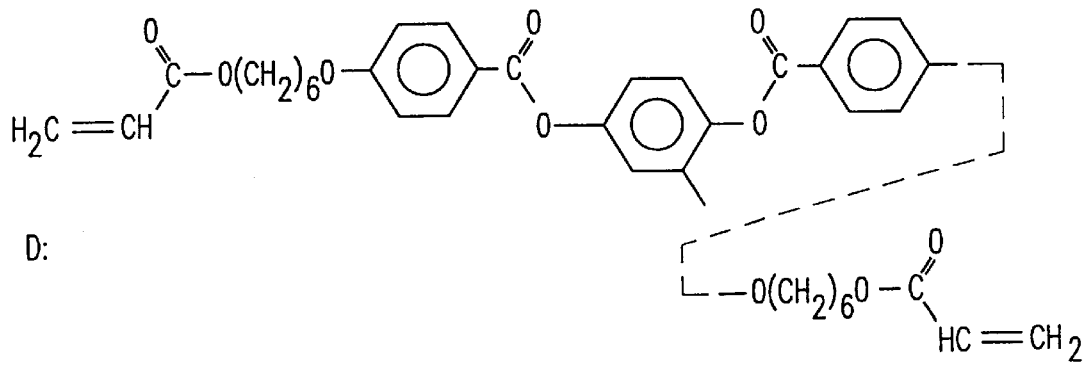

A cell (1) of the display device in accordance with the invention is manufactured in accordance with a first method. An isomerizable chiral dopant A (0.52% by weight) having a first twist sense, as well as a non-isomerizable chiral dopant B (0.52% by weight; ZLI S811; Merck) whose twist sense is opposite to the first twist sense, are added to a mixture of non-reactive monomers (ZLI 4792; Merck). The structures of the dopants A and B are shown in FIG. 2. An empty cell (1), as shown in FIG. 1, is filled with this mixture. Subsequently, a mask having a line pattern is positioned relative to the layer. The width of the lines is approximately 100 micrometers and the pitch between the lines is 200 micrometers.

Subsequently, the liquid-crystalline material is exposed, via the line mask, to light originating from a broadband mercury lamp (intensity 8 mW) for 2 minutes, so that the isomerizable chiral dopant A in the exposed portion of the liquid-crystalline layer is converted. After removal of the mask, the pixels of the cell are found to be subdivided into two types of sub-pixels demonstrating an opposite twist sense. This has the favorable effect that the viewing angle dependence of the display device is substantially reduced relative to that of the same device without the isomerization step.

The durability of the device can be improved by additionally adding 1% by weight of D-type reactive monomers (see FIG. 2) as well as a small quantity of peroxide-initiator to the solution and subjecting the liquid-crystalline layer formed to a thermal treatment after the isomerization step. In said thermal treatment (80° C. for 30 minutes), a polymeric network is formed which counteracts diffusion of the chiral dopants to adjacent sub-pixels. As in the case of said thermally polymerized network, the presence of a photo-polymerized network in the cell, for example on the basis of (meth)acrylates, leads to a higher durability of the improvement of the viewing angle dependence of the display device. However, as in thermal polymerization two different processes (thermal polymerization and photochemical isomerization) are used, the risk of problems is found to be smaller.

A cell (1) of the display device in accordance with the invention is manufactured according to a second method. A reactive isomerizable chiral dopant C (0.93% by weight) having a first twist sense, as well as a non-reactive non-isomerizable chiral dopant B (0.34% by weight) having an opposite twist sense were added to a mixture of non-reactive monomers (ZLI 4792; Merck). A cross-linking agent D (0.5% by weight) and a small quantity of a photo-initiator (Irgacure) were also added to the mixture.

An empty cell (1), as shown in FIG. 1, was filled with this mixture. Subsequently, a mask having a line pattern was positioned relative to the layer. The width of the lines was approximately 50 micrometers and the pitch between the lines was 100 micrometers. Subsequently, the liquid-crystalline material was exposed to light originating from a broadband UV lamp (intensity 1 mW) for 50 minutes, thus causing the reactive chiral dopant C and the cross-linking agent D to be polymerized into a polymeric network. During said exposure of the layer, the reactive chiral dopant diffuses from the unexposed sub-pixels to the exposed sub-pixels in which, subsequently, polymerization takes place.

After removal of the mask, it was found that the pixels of the cell were subdivided into two types of sub-pixels having an opposite twist sense. As a result, the viewing angle dependence of the display device was found to be considerably reduced relative to that of the same device in which no selective diffusion occurred.

Preferably, the mixture of liquid-crystalline material used to fill the empty cell also comprises a certain quantity of reactive, achiral monomers.

The multi-domain liquid-crystal display device in accordance with the invention comprises two substantially parallel substrates which are provided with an electrode layer and an orientation layer. A layer of a nematically ordered liquid-crystalline material comprising a chiral dopant is sandwiched between the substrates. The layer is structured in such a manner that the pixels of the layer are composed of at least two types of sub-pixels in which the twist senses of the liquid-crystalline material are mutually opposite.

In accordance with the invention, this construction is achieved by differentiating the composition of the chiral dopant in the different types of sub-pixels. This is attained by employing isomerizable chiral dopants and/or diffusion techniques in combination with local exposure of the liquid-crystal layer. The invention also provides methods of manufacturing such multi-domain liquid-crystal display devices. The multi-domain liquid-crystal display devices in accordance with the invention are easier to manufacture than display devices in which the orientation layers must be structured.

I claim:

1. A multi-domain liquid-crystal display device comprising two substantially parallel substrates which are provided with an electrode layer and an orientation layer, a layer of a nematically ordered liquid-crystalline material containing a chiral dopant being sandwiched between said substrates, and said layer being structured such that the pixels of the layer are composed of at least two types of sub-pixels in which the twist senses of the liquid-crystalline material are mutually opposite, characterized in that the composition of the chiral dopant in the different types of sub-pixels is different.

2. A liquid-crystal display device as claimed in claim 1, characterized in that the liquid-crystalline material comprises a polymer.

3. A liquid-crystal display device as claimed in claim 2, characterized in that the polymer comprises a polymer network.

4. A liquid-crystal display device as claimed in claim 2, characterized in that a part of the molecules of the chiral dopant are linked to the polymer via a chemical bond.

5. A liquid-crystal display device as claimed in claim 1, characterized in that the orientation layer of the one substrate has pretilt-inducing properties and the orientation layer of the other substrate does not have pretilt-inducing properties.

6. A method of manufacturing a multi-domain liquid-crystal display device, which method comprises the following steps:

applying a layer of a liquid-crystalline material between two substantially parallel substrates which are provided with an electrode layer and an orientation layer, said liquid-crystalline material including an isomerizable chiral dopant with a first twist sense, as well as a non-isomerizable chiral dopant with an opposite twist sense, positioning a mask relative to the layer, locally exposing the layer of liquid-crystalline material by means of the mask, thus causing the isomerizable chiral dopant to be converted.

7. A method as claimed in claim 6, characterized in that the liquid-crystalline material comprises reactive monomers which are polymerized into a polymer.

8. A method as claimed in claim 7, characterized in that the reactive monomers are thermally polymerized to form the polymeric network.

9. A method of manufacturing a multi-domain liquid-crystal display device, which method comprises the following steps:

applying a layer of a liquid-crystalline material between two substantially parallel substrates which are provided with an electrode layer and an orientation layer, said material comprising a reactive chiral dopant demonstrating a first twist sense as well as a non-reactive chiral dopant demonstrating an opposite twist sense, positioning a mask relative to the layer, locally exposing the liquid-crystalline material by means of said mask, thereby causing the reactive chiral dopant to be polymerized.

10. A method as claimed in claim 9, characterized in that the liquid-crystalline material also comprises reactive, achiral monomers.

* * * * *